(12) United States Patent
Nighot et al.

(10) Patent No.: US 11,313,479 B2
(45) Date of Patent: Apr. 26, 2022

(54) NON-PRESSURE RELIEVING BALL VALVE

(71) Applicant: EMERSON PROCESS MANAGEMENT (INDIA) PRIVATE LIMITED, Mumbai (IN)

(72) Inventors: Vikas Pandurang Nighot, Pune (IN); Girish Ramchandra More, Pune (IN)

(73) Assignee: EMERSON PROCESS MANAGEMENT (INDIA) PRIVATE LIMITED, Mumbai (IN)

( * ) Notice: Subject to any disclaimer, the term of this patent is extended or adjusted under 35 U.S.C. 154(b) by 0 days.

(21) Appl. No.: 16/623,361

(22) PCT Filed: Apr. 25, 2018

(86) PCT No.: PCT/IB2018/052865
§ 371 (c)(1),
(2) Date: Dec. 16, 2019

(87) PCT Pub. No.: WO2018/234877
PCT Pub. Date: Dec. 27, 2018

(65) Prior Publication Data
US 2020/0182361 A1 Jun. 11, 2020

(30) Foreign Application Priority Data
Jun. 20, 2017 (IN) .............................. 201721021636

(51) Int. Cl.
*F16K 5/20* (2006.01)
*F16K 5/06* (2006.01)

(52) U.S. Cl.
CPC ............ *F16K 5/201* (2013.01); *F16K 5/0673* (2013.01); *F16K 5/0689* (2013.01)

(58) Field of Classification Search
CPC .......... F16K 5/201; F16K 5/205; F16K 5/208; F16K 5/0673; F16K 5/0689
See application file for complete search history.

(56) References Cited

U.S. PATENT DOCUMENTS 2,810,543 A * 10/1957 Bryant .................. F16K 27/044
251/172
3,252,684 A * 5/1966 Ksieski ................. F16K 5/0668
251/172

(Continued)

FOREIGN PATENT DOCUMENTS

| CA | 2138946 C | 9/2000 |
| CN | 202531898 U | 11/2012 |
| CN | 104235471 A | 12/2014 |

OTHER PUBLICATIONS

International Search Report and Written Opinion for PCT/IB2018/052865, dated Jul. 19, 2018.

*Primary Examiner* — Michael R Reid
(74) *Attorney, Agent, or Firm* — Marshall, Gerstein & Borun LLP (57) ABSTRACT

A non-pressure relieving ball valve that includes: a stem connected to a handle regulating flow of pressurized fluid entering in the ball valve, a ball coupled to the stem and configured to control flow of the pressurized fluid through the ball valve, a seat abutting the ball to retain the in place, a sealing gasket provided in the ball valve and configured to restrict the flow of the pressurized fluid through the ball valve when the ball valve is in a closed position, and a slotted ring configured to be fitted in the ball valve between the seat and the sealing gasket. The slotted ring is adapted to permit ingress of pressurized fluid in slots defined on the slotted ring to enable balancing of fluid pressures on either side of the seat.

18 Claims, 5 Drawing Sheets

(56) References Cited

U.S. PATENT DOCUMENTS

| | | | | |
|---|---|---|---|---|
| 5,275,191 | A * | 1/1994 | Bernard | F16K 5/0684 137/15.22 |
| 5,533,738 | A * | 7/1996 | Hoffmann | F16K 5/201 277/388 |
| 5,542,645 | A * | 8/1996 | Beson | F16K 3/205 251/172 |
| 8,727,314 | B2 * | 5/2014 | Avdjian | F16K 5/205 251/315.01 |
| 9,453,578 | B2 * | 9/2016 | Sundararajan | F16K 3/0236 |
| 2015/0097132 | A1 | 4/2015 | Fan | |
| 2015/0300508 | A1 * | 10/2015 | He | F16K 5/0689 251/314 |

* cited by examiner

HOLES ON RING

STEP ON RING

FIGURE 4C

SLOTTED RING

NON-PRESSURE RELIEVING BALL VALVE

FIELD

The present disclosure relates to the field of mechanical engineering. Particularly, the present disclosure relates to the field of ball valve seat structures.

BACKGROUND

Ball valves are generally used in applications where flow of the fluid is to restricted or enabled through a pipeline. Ball valves frequently open and close during operation and are configured to control flow of a fluid therethrough. Many times, fluid gets trapped inside a valve cavity while opening and closing ball valves. Continuous opening and closing of ball valves lead to continuous trapping of fluid inside the valve cavity, which results in over pressurization of the valve cavity due to temperature variations. Over pressurization of the valve cavity damages the valve parts adversely and may deteriorate performance of the valve. Conventionally, ball valves with self-relieving mechanisms are used to relieve the pressure.

Conventional ball valves generally consist of two seats which abut the ball surface, thereby restricting the flow through the ball valves when the ball is in the closed position. The seats abutting the ball surface may be unidirectional (blocks the flow from one side) or bidirectional (blocks the flow from both side of seat).

In some applications, there is demand for providing double isolation in the ball valve, i.e., when the seat at the upstream side of the ball valve is damaged due to corrosion, rust, etc., and fails to operate as intended, flow of the fluid should be restricted by the seat at the downstream side of the ball valve. For such applications, non-relieving design ball valves are used.

Non-relieving ball valves either consist of one unidirectional seat (restricts the flow from one side) and one bidirectional seat (restricts the flow from either side of the seat), or two bidirectional seats. These non-relieving designs of ball valve are preferred when one seat from where the fluid is entering in the ball valve fails to restrict the flow, causing failure of the system, whereby the other seat comes into function and continuously abuts the ball surface in the closed position of the ball valve, thereby blocking the flow of the fluid towards the downstream side of the ball valve from the valve cavity. The non-relieving design of the ball valve is configured to provide extra isolation at the downstream side of the ball valve.

Figure 1:
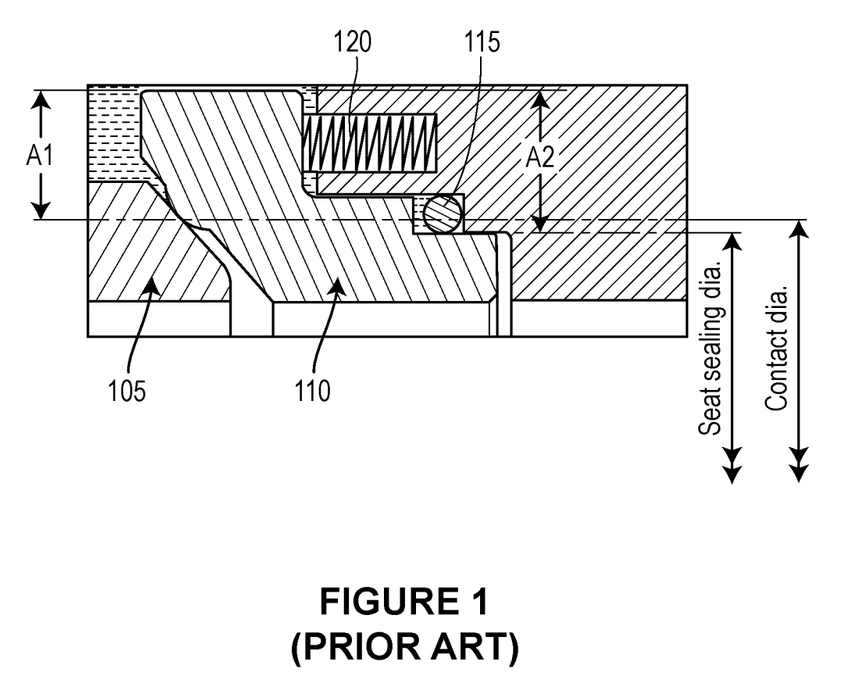
FIG. 1 illustrates a schematic view of a conventional non-relieving ball valve for 0-ring and lip seal applications.

For example, FIG. 1 illustrates the conventional non-relieving type of design having a bidirectional seat 110 typically used with a O-ring or Lip seal as a sealing element 115. When one isolation, i.e., one seat at the upstream side fails, fluid enters in the cavity of the ball valve. The resultant of force at area A1 and A2 exerted by fluid on the seat 110 always pushes the seat 110 towards the ball 105. This ensures the continuous abutment of the seat 110 with the ball surface, thus avoiding the flow of fluid from the valve cavity to the downstream side of the ball valve.

But in case where graphite gaskets are used for sealing the ball valve, such a non-relieving design makes it extremely difficult to get the desired area below the contact line at the back of the seat 110 and therefore does not allow the cavity fluid to ingress in the area below the contact diameter. Such non-pressure relieving double isolation is currently restrictive to only those applications where O-rings and lip seals are used, as they are self-energizing, and does not work when graphite gaskets are used, e.g., for specific applications where O-ring & lip-seals are not suitable, for sealing the ball valve as they are not self-energizing seals.

Hence, there is a need for a non-pressure relieving ball valve having a seat provided with gasket sealing that alleviates the above mentioned drawbacks.

Objects

Some of the objects of the present disclosure, which at least one embodiment herein satisfies, are as follows:

An object of the present disclosure is to provide a non-pressure relieving ball valve having a seat which is provided with gasket sealing.

Another object of the present disclosure is to provide a non-pressure relieving ball valve that prevents flow of fluid at a downstream end, thereby reducing/eliminating the chances of any damage down the line in process/plant when isolation fails.

Yet another object of the present disclosure is to provide a non-pressure relieving ball valve that improves the performance and life of the valve.

Still another object of the present disclosure is to provide a non-pressure relieving ball valve that reduces maintenance costs.

Still another object of the present disclosure is to provide a non-pressure relieving ball valve that works at high and low temperature applications and can satisfy customized requirements.

Other objects and advantages of the present disclosure will be more apparent from the following description, which is not intended to limit the scope of the present disclosure.

SUMMARY

The present disclosure envisages a non-pressure relieving ball valve that comprises: (i) a stem that performs ON/OFF operation of the ball valve which facilitates flow of pressurized fluid in the ball valve, (ii) a ball which is coupled to the stem and is configured to restrict flow of the pressurized fluid through the ball valve, (iii) a seat which abuts the ball to restrict the leakage of the pressurized fluid when the ball is in a closed position, (iv) a sealing gasket which is provided in the ball valve and is configured to restrict the flow of the pressurized fluid through the ball valve, and (v) a slotted ring which is configured to be fitted in the ball valve between the seat and the sealing gasket. The slotted ring of the non-pressure relieving ball valve is adapted to permit ingress of pressurized fluid in gaps, which are defined by the slotted ring to provide a desired extra force from back side of the seat towards the ball for enabling abutment of the seat with the ball. Providing extra force from back side of the seat towards the ball prevents flow of pressurized fluid from a valve cavity of the ball valve towards the upstream/downstream of the ball valve.

In an embodiment of the present disclosure, the slotted ring of the non-pressure relieving ball valve is made of any metallic or non-metallic material. In a preferred embodiment, the slotted ring of the non-pressure relieving ball valve is made of sheet metal. In another embodiment, the slotted ring is fitted inside the ball valve either at the downstream end, at the upstream end, or at both the upstream and downstream ends based on various requirements.

In an embodiment, the non-pressure relieving ball valve includes a pusher ring which is configured to compress the sealing gasket to provide sealing of the seat, thereby restricting the flow of the pressurized fluid through the ball valve when the ball valve is in the closed position. In still another embodiment, the sealing gasket of the non-pressure relieving ball valve is made of graphite or any similar material which can be used for sealing.

In yet another embodiment, the fluid force acting on the seat in the direction of the ball is greater than the fluid force acting on the seat in the direction opposite to the ball.

In an embodiment, the non-pressure pressure relieving ball valve further includes a body that houses the ball, the seat, the sealing gasket, the pusher ring, the spring, and the slotted ring.

BRIEF DESCRIPTION OF THE DRAWINGS

A non-pressure relieving ball valve of the present disclosure will now be described with the help of the accompanying drawing, in which.

LIST OF REFERENCE NUMERALS

| Reference numeral | References associated with reference numeral |
| --- | --- |
| 100 | Conventional non-relieving ball valve with O-ring/lip-seal sealing |
| 105 | Conventional Ball |
| 110 | Conventional Seat |
| 115 | Conventional Sealing area (O-Ring/Lip Seal) |
| 120 | Conventional Spring |
| A1 | Area at seat contact point |
| A2 | Area at sealing point |
| 150 | Non-pressure relieving Ball Valve |
| 155 | Ball |
| 160 | Seat |
| 165 | Sealing Gaskets |
| 170 | Slotted Ring |
| 175 | Pusher Ring |
| 180 | Body |
| 185 | Stem |
| 190 | Spring |
| 195 | Spring Cartridge |
| B1 | Area at seat contact point |
| B2 | Area at sealing point |
| C1 | Area at seat contact point |
| C2 | Area at sealing point |

DETAILED DESCRIPTION

Ball valves are generally used in applications where the flow of the fluid is to be restricted or enabled through a pipeline. Ball valves frequently open and close during operation and are configured to control flow of a fluid therethrough. Many times, fluid gets trapped inside a valve cavity while opening and closing ball valves. Continuous opening and closing of ball valves lead to continuous trapping of fluid inside the valve cavity, which results in over pressurization of the valve cavity due to temperature variations. Over pressurization of the valve cavity damages the valve parts adversely and may deteriorate performance of the valve. Conventionally, ball valves with self-relieving mechanisms are used to relieve the pressure.

Conventional ball valves generally consist of two seats which abut the ball surface, thereby restricting the flow through the ball valves when the ball is in the closed position. The seats abutting the ball surface may be unidirectional (blocks the flow from one side) or bidirectional (blocks the flow from both side of seat).

In some applications, there is demand for providing double isolation in the ball valve, i.e., when the seat at the upstream side of the ball valve is damaged or fails to operate as intended because of corrosion, rust, etc., flow of the fluid should be restricted by the seat at the downstream side of the ball valve and vice versa. For such applications, non-relieving design ball valves are used.

Non-relieving ball valves either consist of one unidirectional seat (restricts the flow from one side) and one bidirectional seat (restricts the flow from either side of the seat), or two bidirectional seats. This non-relieving design of ball valves is preferred when one seat from where the fluid is entering in the ball valve fails to restrict the fluid flow, causing failure of the system, whereby the other seat comes into function and continuously abuts the ball surface in the closed position of the ball valve, thereby blocking the flow of the fluid towards the other side of the ball valve from the valve cavity. The non-relieving design of the ball valve is configured to give an extra isolation at the upstream/downstream side of the ball valve.

For example, FIG. 1 illustrates the conventional non-relieving type of design having a bidirectional seat 110 typically used with a O-ring or Lip seal as a sealing element 115. When one isolation, i.e., one seat at the upstream/downstream side fails, fluid enters in the cavity of the ball valve. The resultant of force at area A1 and A2 exerted by fluid on the seat 110 always pushes the seat 110 towards the ball 105. This ensures the continuous abutment of the seat 110 with the ball surface, thus avoiding the flow of fluid from the valve cavity to the upstream/downstream side of the ball valve.

But in case where graphite gaskets are used for sealing the ball valve, such a non-relieving design makes it extremely difficult to get the desired area below the contact line at the back of the seat 110 and therefore does not allow the cavity fluid to ingress in the area below contact diameter. Such non-pressure relieving double isolation is currently restrictive to only those applications where O-rings and lip seals are used, and does not work when graphite gaskets are used for sealing the ball valve.

The present disclosure envisages a non-pressure relieving ball valve having a seat provided with sealing gaskets, which alleviates the above mentioned drawbacks. The non-pressure relieving ball valve, in accordance with an embodiment of the present disclosure, will now be described with reference to the embodiments, which do not limit the scope and ambit of the disclosure. The description of the non-pressure relieving ball valve is provided purely by way of example and illustration. The non-pressure relieving ball valve is now described with reference to FIG. 2 through FIG. 4d.

Figure 2:
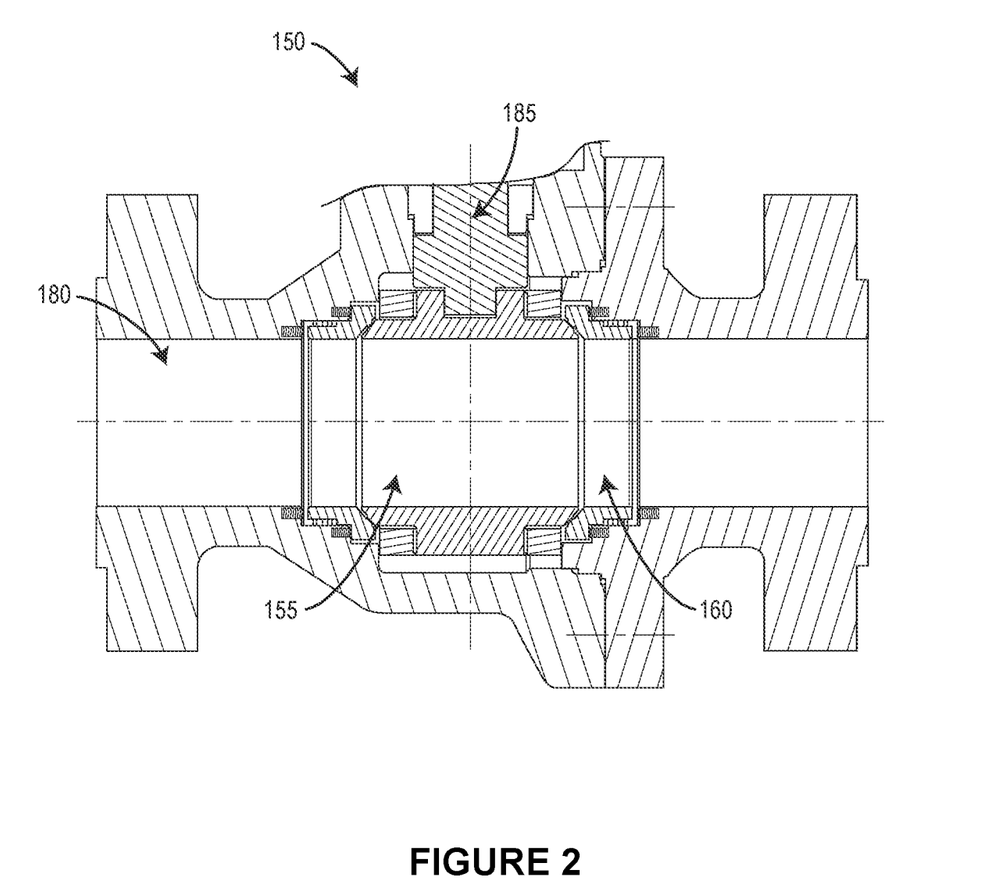
FIG. 2 illustrates a schematic view of a non-pressure relieving ball valve in accordance with an embodiment of the present disclosure.
Figure 3:
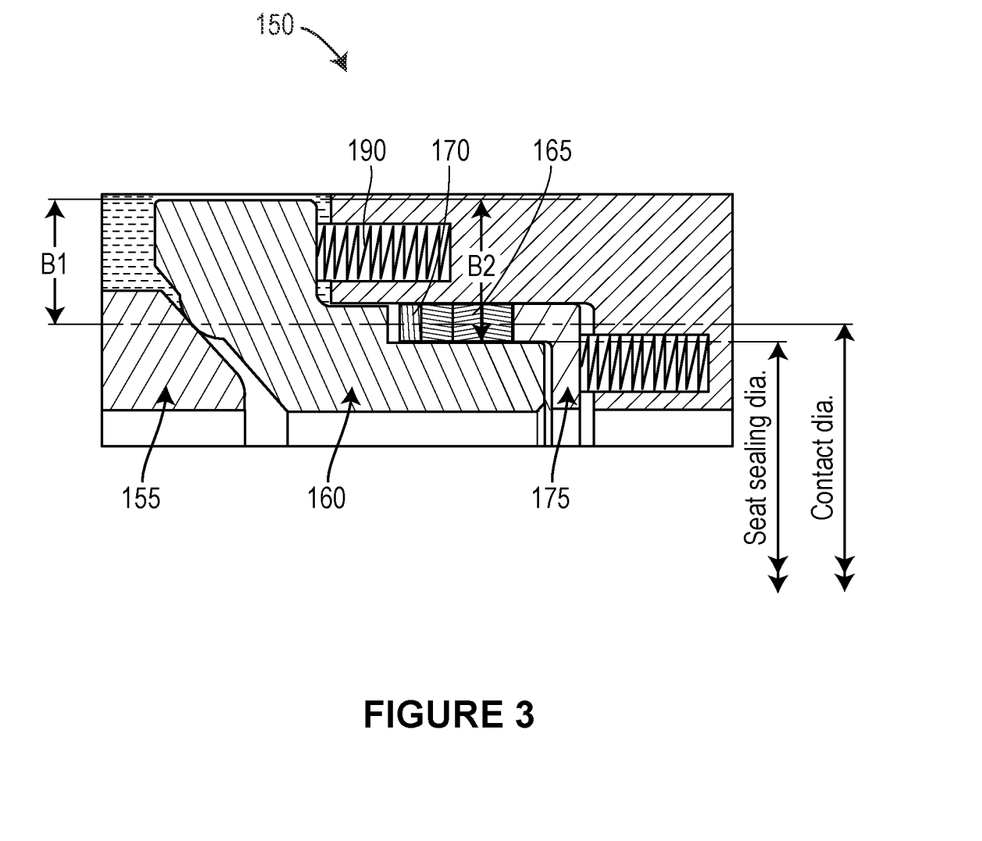
FIG. 3 illustrates a schematic view of the mechanism of the non-pressure relieving ball valve of FIG. 2.

FIG. 2 illustrates a schematic view of a non-pressure relieving ball valve 150 in accordance with an embodiment of the present disclosure. FIG. 3 illustrates a schematic view of the mechanism of the non-pressure relieving ball valve 150.

The non-pressure relieving ball valve 150 of the present disclosure comprises a body 180, a stem 185, a ball 155, a seat 160, a sealing gasket 165, and a slotted ring 170. The stem 185 is configured to perform ON/OFF operation of the ball valve 150, which facilitates flow of pressurized fluid in the ball valve 150. The ball 155, which is coupled to the other end of the stem 185, is configured to restrict flow of the pressurized fluid through the ball valve 150. The ball 155 has a hollow, perforated, and pivoting configuration such that the hollow region of the ball 155 is kept perpendicular to a passage provided inside the ball valve 150 for restriction of the flow of pressurized fluid when the ball valve 150 is in a closed position. The hollow region of the ball 155 is kept parallel, i.e., the opening of the hollow region of the ball 155 is kept in fluid communication with the passage, when the ball valve 150 is in an open position. In one embodiment, the stem 185 is configured to rotate or displace the ball 155 to achieve the open and closed positions of the ball valve 150.

The seat 160 of the ball valve 150 is configured to abut the ball 155 so as to restrict the leakage of the pressurized fluid when the ball 155 is in the closed position.

The sealing gasket 165 is configured to restrict the flow of the pressurized fluid through the ball valve 150. The sealing gasket 165 is generally provided between the body 180 of the ball valve 150 and the slotted ring 170. In an embodiment, the non-pressure relieving ball valve 150 includes a pusher ring 175 which is configured to compress the sealing gasket 165. Compression of the sealing gasket 165 enables sealing of the seat 160, thereby restricting the flow of the pressurized fluid through the ball valve 150. In still another embodiment, the sealing gasket 165 of the non-pressure relieving ball valve 150 is made of graphite or any similar material used for sealing. In an embodiment, the body 180 of the non-pressure relieving ball valve 150 houses the ball 155, the seat 160, the sealing gasket 165, the pusher ring 175, the spring and the slotted ring 170.

The slotted ring 170 is configured to be fitted in the ball valve 150 between the seat 160 and the sealing gasket 165. The slotted ring 170 of the non-pressure relieving ball valve 150 is adapted to permit ingress of pressurized fluid in gaps, which are defined by the slotted ring 170 to provide desired extra force from the back side of the seat 160 towards the ball 155 for enabling abutment of the seat 160 with the ball 155. Providing extra force from the back side of the seat 160 towards the ball 155 prevents flow of pressurized fluid from a valve cavity of the ball valve 150 towards the upstream/downstream ends of the ball valve 150. The pressure on one side of the seat 160, i.e. the side from where the force is acting on the region above the contact line (labelled in FIG. 3) in a direction away from the ball 155, is overpowered by allowing fluid to enter within the gaps of the slotted ring 170, thereby increasing the sealing surface region through which the fluid exerts an equivalent or larger force on the seat 160 in the direction towards the ball 155. This exerted fluidic pressure on either side of the seat 160 prevents flow of pressurized fluid from the valve cavity of the ball valve 150 towards the upstream/downstream end of the ball valve 150. In an embodiment of the present disclosure, the slotted ring 170 of the non-pressure relieving ball valve 150 is made of any metallic or non-metallic material. In a preferred embodiment, the slotted ring 170 of the non-pressure relieving ball valve 150 is made of sheet metal.

In an embodiment, the slotted ring 170 is fitted inside the ball valve 150 either at the downstream end, at the upstream end, or at both upstream and downstream end. The provision of the slotted ring 170 at both the upstream and downstream ends in the upstream and downstream seats results in double isolation. Double isolation restricts the flow of high pressurized fluid inside the valve cavity as well as towards the downstream end. In an embodiment, both the upstream and downstream seats act as a bidirectional isolation seat, i.e., blocking fluid from both sides. In such a case, a cavity relief valve is required to relieve the pressure from the valve cavity. In another embodiment, one of the seats from the upstream seat or the downstream seat is unidirectional and the other one is bidirectional. In yet another embodiment, the non-pressure relieving ball valve 150 of the present disclosure keeps the fluid pressure acting on the seat 160 in the direction of the ball 155 always greater than the fluid pressure acting on the seat 160 in the direction opposite to the ball 155.

FIG. 3 illustrates the non-pressure relieving ball valve 150 with the slotted ring 170 between the seat 160 and the graphite seal 165. B1 represents an area at the seat contact point, moving the seat 160 away from the ball 155. B2 represents an area at the sealing point, moving the seat 160 towards the ball 155. The resultant force of at area B1 and B2 moves the seat 160 towards the ball 155 when cavity pressure increases and does not relieve the pressure, thereby keeping the seat in contact with the ball 155.

When the non-pressure relieving ball valve 150 of the present disclosure is compared with the conventional ball valve 100, it is observed that due to the provision of slotted ring 170 between the seat 160 and the gasket sealing 165, an extra force is generated against the away movement of the seat 160 with respect to the ball 155, keeping the seat 160 abutted to the ball 155.

Figure 4A:
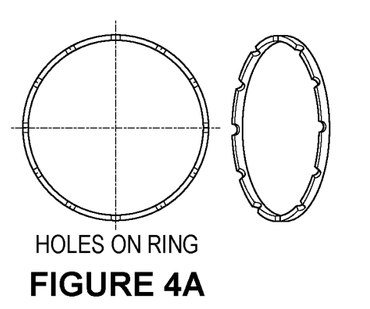
FIGS. 4a to 4d illustrate different cross-sectional views of a slotted ring having different shapes, provided in the non-pressure relieving ball valve, in accordance with different embodiments of the present disclosure.
Figure 4B:
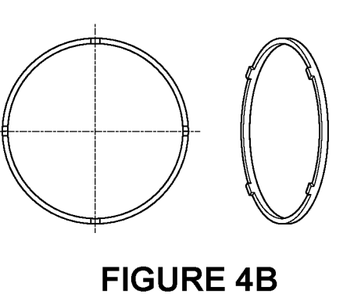
Figure 4C:
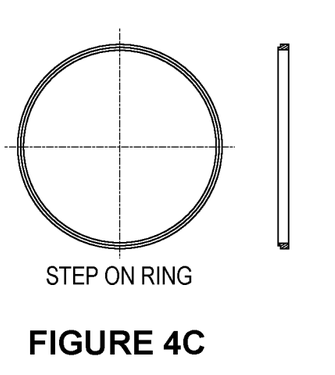
Figure 4D:
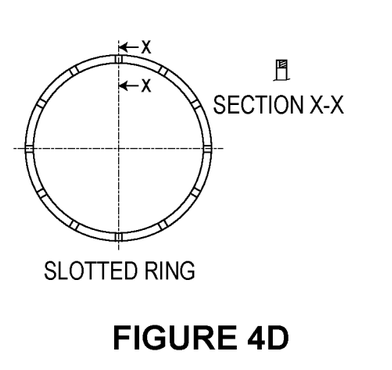

FIGS. 4a to 4d illustrate different cross-sectional views of the slotted ring 170 having different shapes, each of which is fitted in the non-pressure relieving ball valve 100, in accordance with different embodiments of the present disclosure. In an embodiment, the slotted ring 170 may be in the form of a ring with drilled holes (as shown in FIG. 4a), a machined ring with four raised rests (as shown in FIG. 4b), a machined ring with steps on the ring (as shown in FIG. 4c), or a ring with plurality of slots (as shown in FIG. 4d). In an embodiment, the slotted ring 170 can be of any shape or size and the cross-sectional views illustrated in FIGS. 4a to 4d do not restrict the scope and ambit of the present disclosure.

Figure 5:
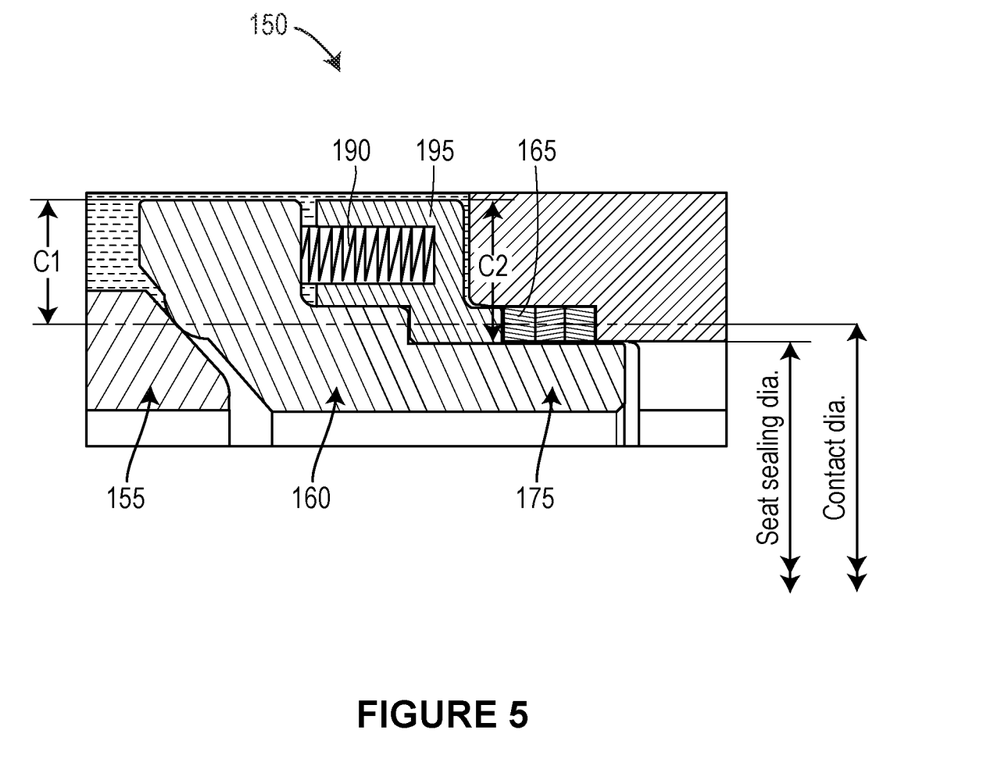
FIG. 5 illustrates a schematic view of an alternative mechanism of a non-pressure relieving ball valve in accordance with an embodiment of the present disclosure.

In an alternative embodiment, as illustrated in FIG. 5, the slotted ring 170 can be provided with a spring cartridge 195 having a spring 190 disposed therein, which is configured to exert pressure on the seat 160 towards the ball 155 by allowing fluid to enter within a confined space of the spring cartridge 195, thereby increasing the sealing surface region through which the fluid exerts larger force on the seat 160 in the direction towards the ball 155. The spring force exerted by the spring 190 keeps the seat 160 in contact with the ball 155 of the ball valve 150. By exerting higher fluidic pressure on the seat 160 towards the ball 155, the seat 160 prevents flow of pressurized fluid in the valve cavity formed within the ball valve 150 when the seat 160 moves away from the ball 155 under high pressure. C1 represents the force acting at the seat on the area above the ball-seat contact diameter, moving the seat away from the ball. C2 represents the force acting at the seat on the area above the seat sealing diameter, moving the seat towards the ball. This Resultant force is equal to the difference between C2 and C1 and results in double isolation of the ball valve 150.

In yet another embodiment, the non-pressure relieving ball valve can be used in applications such as gas service, pumps, oil and gas industry, fire safe protection services and the like. Advantages of the non-pressure relieving ball valve are: (i) it prevents or restricts the flow of fluid at downstream end of a ball and seat arrangement, thereby eliminating the chances of fluid entering from the valve cavity towards the downstream end of the ball valve, (ii) it improves the performance of the ball valve, and (iii) it reduces the overall maintenance cost.

TECHNICAL ADVANCEMENTS

The present disclosure described herein above has several technical advantages including, but not limited to, the realization of a non-pressure relieving ball valve having a seat provided with gasket sealing that:

prevents the flow of fluid at both the upstream and downstream ends, thereby reducing/eliminating the chances of any damage to the valve part when any of the isolation fails;

improves the performance and life of the valve;

reduces maintenance costs; and works at high and low temperature applications and satisfies customized requirements.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A non-pressure relieving ball valve comprising:
   a valve body;
   a ball movably disposed in the valve body to control a flow of pressurized fluid through the valve body;
   a stem coupled to the ball and configured to move the ball between a closed position and an open position;
   a seat disposed within the valve body and abutting the ball to restrict the leakage of the pressurized fluid when the ball is in closed position;
   a spring disposed between the seat and the valve body;
   a sealing gasket configured to restrict the flow of said pressurized fluid through the ball valve from either side of the seat;
   a pusher ring configured to compress the sealing gasket to seal the seat; and
   a slotted ring fitted in the ball valve between the seat and the sealing gasket;
   wherein the slotted ring is adapted to permit ingress of pressurized fluid in gaps defined on the slotted ring to provide a desired extra force from a back side of the seat towards the ball for facilitating abutment of the seat with the ball, thereby preventing the flow of pressurized fluid from a valve cavity of the ball valve towards the upstream/downstream end of the ball valve, and
   wherein the seat comprises a leg, and wherein the sealing gasket is seated against the leg such that the sealing gasket is disposed between the leg and the valve body.

2. The non-pressure relieving ball valve as claimed in claim 1, wherein the slotted ring is made of a metallic material.

3. The non-pressure relieving ball valve as claimed in claim 1, wherein the slotted ring is fitted inside the valve body at the downstream end, at the upstream end, or at both the upstream and downstream ends.

4. The non-pressure relieving ball valve as claimed in claim 1, wherein the sealing gasket is made of graphite.

5. The non-pressure relieving ball valve as claimed in claim 1, wherein the ball valve keeps the fluid force that is acting on the seat in the direction of the ball greater than the fluid force acting on the seat in the direction opposite to the ball.

6. The non-pressure relieving ball valve as claimed in claim 1, wherein the valve body houses the ball, the seat, the sealing gasket, the pusher ring, and the slotted ring.

7. The non-pressure relieving ball valve as claimed in claim 1, wherein the slotted ring is made of a non-metallic material.

8. The non-pressure relieving ball valve as claimed in claim 2, wherein the slotted ring is made of sheet metal.

9. The non-pressure relieving ball valve as claimed in claim 1, wherein the slotted ring is seated against the leg of the seat such that the slotted ring is disposed between the leg and the valve body.

10. The non-pressure relieving ball valve as claimed in claim 1, wherein the seat directly engages the valve body.

11. The non-pressure relieving ball valve as claimed in claim 1, further comprising:
a second spring carried by the valve body and configured to compress the pusher ring toward the sealing gasket.

12. The non-pressure relieving ball valve as claimed in claim 1, wherein the sealing gasket directly engages the slotted ring.

13. The non-pressure relieving ball valve as claimed in claim 1, wherein the slotted ring is at least partially disposed in the valve body.

14. A non-pressure relieving ball valve comprising:
a valve body;
a ball movably disposed in the valve body to control a flow of pressurized fluid through the valve body;
a stem coupled to the ball and configured to move the ball between a closed position and an open position;
a seat disposed within the valve body and abutting the ball to restrict the leakage of the pressurized fluid when the ball is in the closed position;
a sealing gasket configured to restrict the flow of pressurized fluid through the valve body from either side of the seat;
a spring cartridge disposed within the valve body; and
a spring disposed within the spring cartridge and configured to exert pressure on the seat towards the ball by allowing fluid to enter within a confined space defined by the spring cartridge, thereby increasing a sealing surface region through which the fluid exerts an equivalent or larger force on the seat in a direction towards the ball,
wherein the spring is disposed at a position radially outward of the sealing gasket, and
wherein the sealing gasket is arranged in a space defined between a surface of the spring cartridge, a surface of the seat, and a surface of the valve body.

15. The non-pressure relieving ball valve as claimed in claim 14, wherein the spring cartridge has a first axial end, a second axial end opposite the first axial end, and a surface disposed between the first axial end and the second axial end, wherein the confined space is partially defined by the surface, and wherein the sealing gasket is seated against the second axial end.

16. The non-pressure relieving ball valve as claimed in claim 14, wherein the sealing gasket is made of graphite.

17. The non-pressure relieving ball valve as claimed in claim 14, wherein the sealing gasket directly engages the seat and/or the valve body.

18. A non-pressure relieving ball valve comprising:
a valve body;
a ball movably disposed in the valve body to control a flow of pressurized fluid through the valve body;
a stem coupled to the ball and configured to move the ball between a closed position and an open position;
a seat disposed within the valve body and abutting the ball to restrict the leakage of the pressurized fluid when the ball is in closed position;
a sealing gasket configured to restrict the flow of said pressurized fluid through the ball valve from either side of the ball valve; and
a slotted ring fitted in the ball valve between the seat and the sealing gasket;
wherein the slotted ring is adapted to permit ingress of pressurized fluid in gaps defined on the slotted ring to provide a desired extra force from a back side of the seat towards the ball for facilitating abutment of the seat with the ball, thereby preventing the flow of pressurized fluid from a valve cavity of the ball valve towards the upstream/downstream end of the ball valve,
wherein the seat comprises a leg, and wherein the sealing gasket is seated against the leg such that the sealing gasket is disposed between the leg and the valve body, and
wherein the sealing gasket directly engages the slotted ring.

* * * * *